(12) United States Patent
Piazza

(10) Patent No.: US 6,573,469 B1
(45) Date of Patent: Jun. 3, 2003

(54) GAS-INSULATED SWITCHGEAR DEVICE

(75) Inventor: Costante Piazza, Lodi (IT)

(73) Assignee: ABB Service S.R.L., Milan (IT)

(*) Notice: Subject to any disclaimer, the term of this patent is extended or adjusted under 35 U.S.C. 154(b) by 0 days.

(21) Appl. No.: 09/807,422

(22) PCT Filed: Oct. 18, 1999

(86) PCT No.: PCT/EP99/07915
§ 371 (c)(1),
(2), (4) Date: May 8, 2001

(87) PCT Pub. No.: WO00/24100
PCT Pub. Date: Apr. 27, 2000

(30) Foreign Application Priority Data

Oct. 20, 1998 (IT) .......................................... MI98A2258

(51) Int. Cl.[7] .............................................. H01H 33/14
(52) U.S. Cl. ............................. 218/7; 218/14; 218/154; 218/4; 218/2; 218/12
(58) Field of Search ................................ 335/7, 14, 78, 335/84, 2, 4, 9, 10, 11, 12, 13, 154

(56) References Cited

U.S. PATENT DOCUMENTS 4,300,028 A   11/1981  Cronin et al.
4,434,335 A * 2/1984  Natsui et al. ............... 218/154
5,796,060 A   8/1998  Fuechsle et al.
6,271,493 B1 * 8/2001  Ponsioen ..................... 218/22

* cited by examiner

Primary Examiner—Lincoln Donovan
(74) Attorney, Agent, or Firm—Oblon, Spivak, McClelland, Maier & Neustadt, P.C.

(57) ABSTRACT

A gas-insulated switchgear device. A casing is provided with a first connection terminal and a second connection terminal, an interruption unit, and a disconnection unit. The disconnection unit includes a first fixed contact connected to the second connection terminal. A second fixed contact is at ground potential. A third fixed contact is connected to the first connection terminal. A first moving contact can be coupled to the third fixed contact. A second moving contact can be coupled to at least one of the first and second fixed contacts, and is electrically connected to the interruption unit. The second moving contact is rigidly fixed to a rotating actuation element. At least one of the first and second fixed contacts lies on the rotation plane of the second moving contact. The interruption unit includes an interruption chamber having a rotating case with a stationary contact and a mobile contact. A longitudinal axis of the interruption chamber is aligned with the rotating actuation element. The first moving contact is fixed on the case of the interruption chamber such that the third fixed contact lies in a rotation plane of the first moving contact.

8 Claims, 3 Drawing Sheets

GAS-INSULATED SWITCHGEAR DEVICE

CROSS-REFERENCE TO RELATED APPLICATIONS

This application claims the benefit of priority to PCT International Application no. PCT/EP99/07915, filed Oct. 18, 1999, which claims the benefit of priority to Italian Application no. MI98A002258, filed Oct. 20, 1998.

FIELD OF THE INVENTION

The present invention relates to a gas-insulated switchgear device, particularly for high- and medium-voltage applications, i.e. for voltages greater than 1000V, which comprises particular elements for actuating the disconnection operation.

DESCRIPTION OF RELATED ART

It is known from the state of the art that electrical operations, both for interruption and for disconnection, in gas-insulated switchgear devices are performed by means of the translatory motion of one or more moving contacts which can couple/uncouple with corresponding fixed contacts. The actuation devices most frequently used in conventional metal-clad devices comprise mechanical or hydraulic actuators which are mechanically connected to a moving contact to be moved by means of suitable actuation means.

The actuation devices of the prior art generally require complicated kinematic systems for transmitting motion to the moving contact. In particular, the disconnection operation requires the coordinated movement of one or more moving contacts so that the opening/closure of the disconnection contacts occurs according to the intended sequence. This usually requires complicated coupling mechanisms and/or complicated actuation and control systems, especially when disconnection occurs on multiple-bar systems.

Because of the mechanical complexity of the actuation means, maintenance is required in order to maintain nominal behavior and therefore ensure repeatability of the operation, compensating for variations due to wear and aging of the system.

Further the large number of parts and component entails an increase in the dimensions and total volume of the gas-insulated device, with a consequent increase ill terms of costs.

BRIEF SUMMARY OF THE INVENTION

The aim of the present invention is to provide a gas-insulated switchgear device in which the disconnection operation occurs in a simple and easily controllable manner.

Within the scope of this aim, an object of the present invention is to provide a gas-insulated switchgear device which has a reduced mechanical complexity. Another object of the present invention is to provide a gas-insulated switchgear device in which the disconnection operation occurs by means of the actuation of a reduced number of mechanical parts.

Another object of the present invention is to provide a gas-insulated switchgear device whose dimensions and space occupation are reduced. Not the last object of the present invention is to provide a gas-insulated switchgear device which is highly reliable, relatively easy to manufacture and at competitive costs.

This aim, these objects and others which will become better apparent hereinafter are achieved by a gas-insulated switchgear device, comprising a casing provided with a first connection terminal and a second connection terminal and containing an interruption unit and a disconnection unit, said disconnection unit comprising a first fixed contact connected to the second connection terminal and a second fixed contact at ground potential, and at least one moving contact which can be coupled to at least one of said fixed contacts and is electrically connected to said interruption unit, characterized in that said moving contact is rigidly fixed to a rotating actuation element and in that the fixed contact that can be coupled to said moving contact lies on the rotation plane of the moving contact.

In the device according to the present invention, the disconnection operation accordinly occurs by means of a rotation of the moving contact about a rotation axis. By virtue of the rotation, the moving contact couples/uncouples with the corresponding fixed contact (or contacts), performing the required disconnection operation. For this purpose, the moving contact and the fixed contact are arranged in such a relative position that the end of the fixed contact that must engage the end of the moving contact lies in the rotation plane traced by said end of the moving contact. For the sake of simplicity, when referring to the relative position of the fixed contact and of the moving contact in the present invention, reference is always made to the relative position of the ends of the fixed contact and of the moving contact that can be coupled thereto.

By selecting appropriate dimensions for the position of the fixed contacts and of the moving contacts in a longitudinal direction with respect to the rotation axis of the rotating actuation element and by appropriately varying their relative angular position with respect to the rotation axis, it is possible to minimize the volume and space required by the disconnection unit, and therefore by the entire device, while maintaining easy execution of the disconnection operation.

BRIEF DESCRIPTION OF THE DRAWINGS

Further characteristics and advantages of the device according to the present invention will become better apparent from the description of preferred but not exclusive embodiments of a switchgear device according to the invention, illustrated only by way of non-limitative example in the accompanying drawings, wherein.

DETAILED DESCRIPTION OF THE PREFERRED EMBODIMENTS

Figure 1:
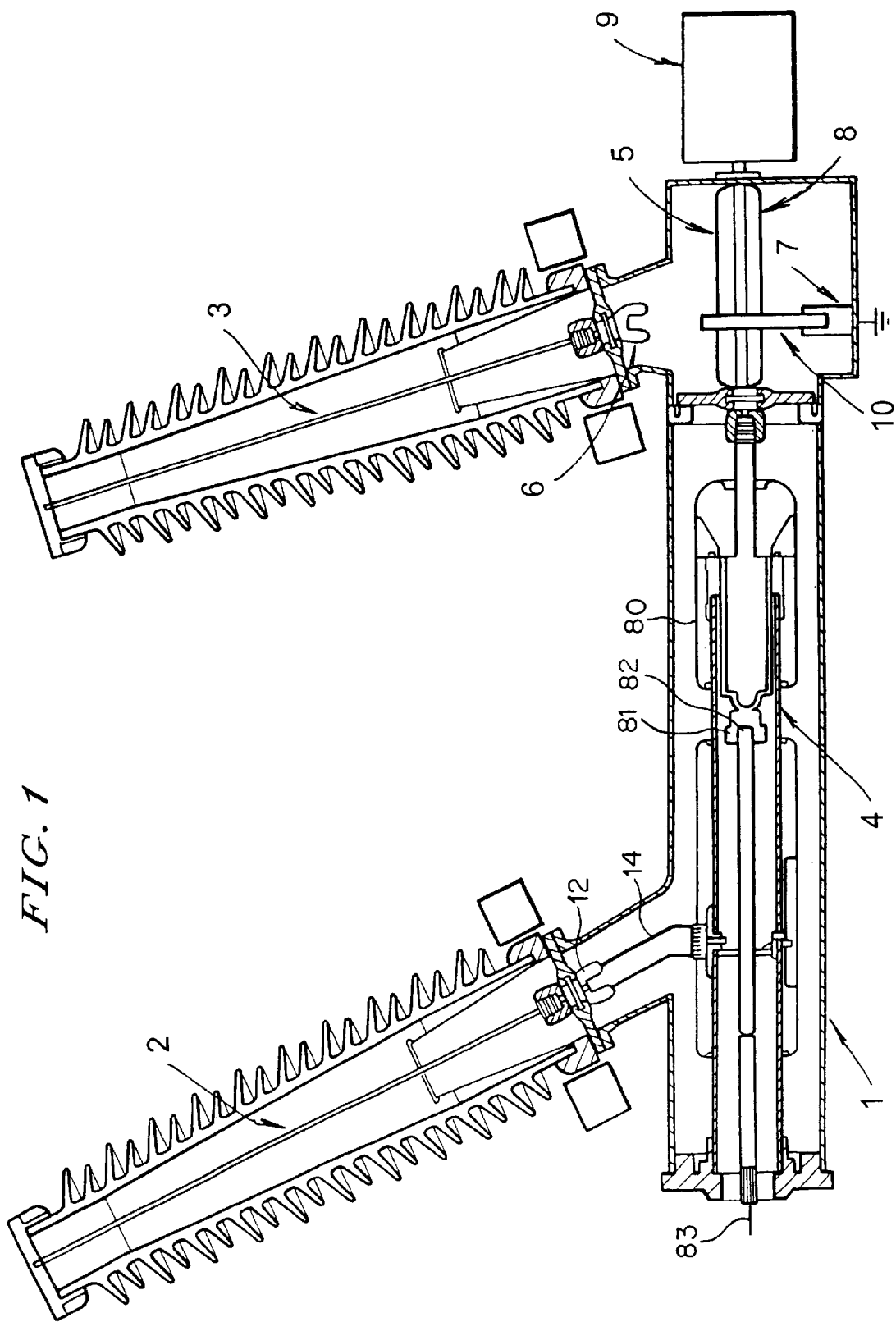
FIG. 1 is a view of an embodiment of a gas-insulated switchgear device for a single-bar system with a single-pole actuation device according to the invention.

With reference to FIG. 1, the device according to the present invention comprises a casing 1 having a first connection terminal 2 and a second connection terminal 3; for example, in a preferred embodiment the first terminal 2 and the second terminal 3 can be electrically connected in input and output to/from the device with a phase of an electrical line, respectively. Alternatively, the first terminal 2 and the second terminal 3 can be connected in input and output with an electrical line and with a power or distribution transformer, respectively; however, other connections can be realized according to the various possible applications.

Inside the casing 1, which contains an insulating gas, there are an interruption unit 4 and a disconnecting unit 5. The first terminal 2 is electrically connected to the interruption unit 4. The disconnection unit 5 comprises a first fixed contact 6, which is connected to the second terminal 3, and a second fixed contact 7 at ground potential. In the case of FIG. 1, the fixed contact 7 is connected to the casing I placed at ground potential. The disconnection unit 5 comprises a rotating shaft 8 moved by actuation means schematically represented by a unit 9 which can be, for example, an appropriately controlled electric motor (e.g., a servo-motor).

A moving contact 10, electrically connected to the interruption unit 4, is fixed to the shaft 8 and rigidly rotates with it. In the embodiment of FIG. 1, the moving contact is constituted by a blade which has a profile shaped like a circular sector and is keyed on the shaft 8. The moving contact 10, the first fixed contact 6 and the second fixed contact 7 are arranged so that the ends of such fixed contacts lie in the plane traced by the rotation of the end of the moving contact 10. The disconnection operation occurs by turning shaft 8, consequently the moving contact 10 rigidly coupled thereto couples with the fixed contact 6 or 7, thus realizing the line or ground connection, respectively. In FIG. 1, the moving contact 10 is coupled to the fixed contact 7; the ground connection is therefore closed while the output connection is open.

Figure 2:
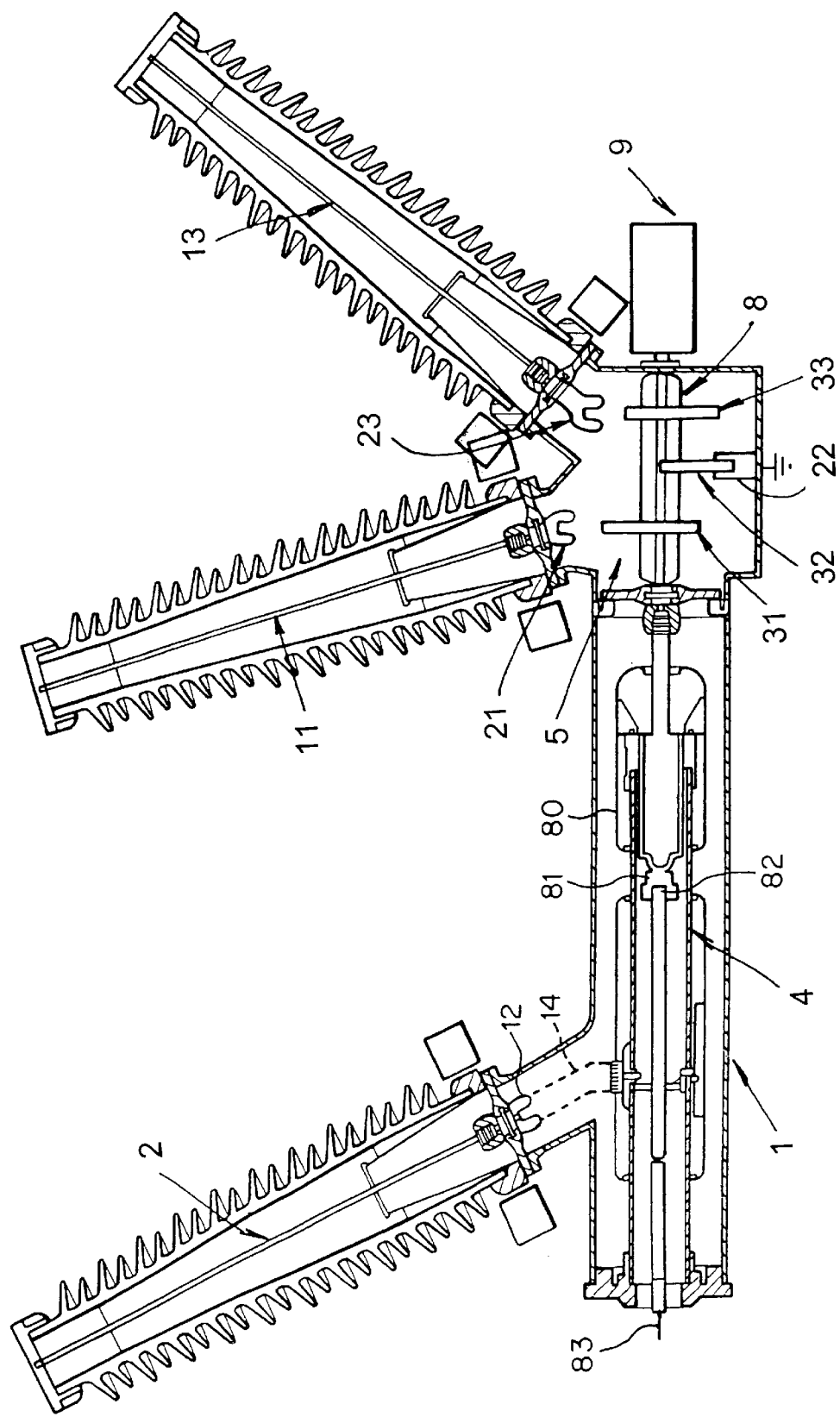
FIG. 2 is a view of an embodiment of a gas-insulated switchgear device for a two-bar system with a single-pole actuation device according to the invention.

According, to all alternative embodiment, not shown in the FIG, it is possible to have two moving contacts fixed to the shaft 8 and each one of such moving contacts can be coupled to a corresponding fixed contact. In this case, the fixed contact 6 ties on the rotation plane of a first moving contact which can be coupled thereto, while the fixed contact 7 lies in the rotation plane of the second moving contact which can be coupled thereto. Further, the first moving contact and the second moving contact are fixed to the shaft 8 in such a relative angular position that they cannot be simultaneously coupled to the fixed contacts 6 and 7. In this way rotation of the shaft 8 produces, for example, the mutual uncoupling of the fixed contact 6 and the first moving contact and then the mutual coupling of the fixed contact 7 and the second moving contact, accordingly performing ground disconnection. A similar procedure is performed to open the ground disconnection contact and close the line contact. Referring to FIG. 2, a gas-insulated switchgear device for a double-bar system is now described. The device of FIG. 2 comprises a casing 1 which has a first connection terminal 2, a second connection terminal 11 and a third connection terminal 13. Preferably, the first connection terminal 2 can be electrically connected in input to the device with a phase of an electrical line, and the second terminal 11 and the third terminal 13 are connected in output from the device with the phase of the line and with a power or distribution transformer, respectively; however, also in this case, many other configurations can be adopted according to the various applications.

An interruption unit 4 and a disconnection unit 5 are arranged inside the casing 1, which contains an insulating gas. The first terminal 2 is electrically connected to the interruption unit 4. The disconnection unit 5 comprises a first fixed contact 21 connected to the second terminal 11, a second fixed contact 22 at ground potential, and a third fixed contact 23 connected to the third terminal 13. As in FIG. 1, the fixed contact 22 is connected to the casing 1, which is at ground potential. The disconnection unit 5 comprises a rotating shaft 8 which is moved by actuation means schematically represented by the unit 9, which can be for example an appropriately controlled electric motor.

A first moving contact 31, a second moving contact 32 and a third moving contact 33, electrically connected to the interruption unit 4, are fixed to the shaft 8 and rotate rigidly with it. In the embodiment of FIG. 2, the moving contacts 31, 32 and 33 are constituted by blades having a profile shaped like a circular sector, which are keyed to the shaft 8. The moving contacts 31, 32 and 33 and the fixed contacts 21, 22 and 23 are arranged so that for each pair of contacts (21. 31), (22, 32) and (23, 33) the fixed contact lies in the rotation plane of the corresponding moving contact. Further, the moving contacts 31, 32 and 33 are fixed to the shaft 8 in such a relative angular position that the moving contact 32 cannot be coupled to the fixed contact 22 when the moving contact 31 and/or the moving contact 33 are coupled to the corresponding fixed contacts 21 and 23. The disconnection operation occurs by turning the shaft 8; accordingly, the moving contacts 31, 32 and 33 that are rigidly fixed thereto couple to the respective fixed contacts 21, 22 and 23. In the embodiment of FIG. 2 the moving contact 32 is coupled to the fixed contact 22, while the moving contacts 31 and 33 are uncoupled from the respective fixed contacts 21 and 23, the ground connection is therefore closed and the output connections are open.

The operating principle is shown schematically in FIGS. 3a–3d, in which the moving contacts are constituted by blades keyed on the shaft 8.

Figure 3A:
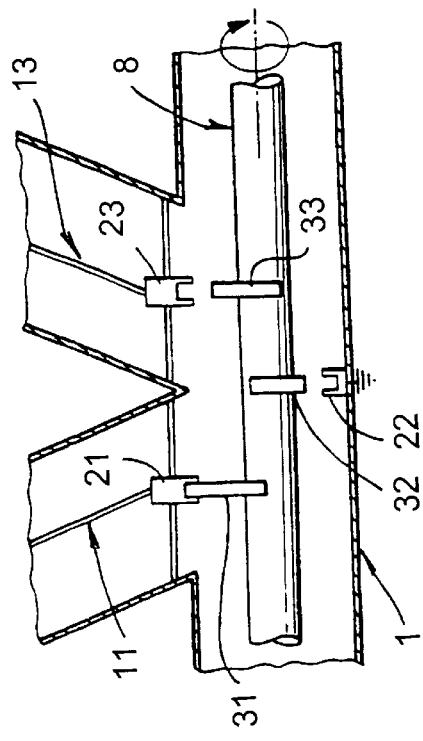
FIGS. 3a–3d are schematic views of disconnection operations which can be performed with the device of FIG. 2.
Figure 3B:
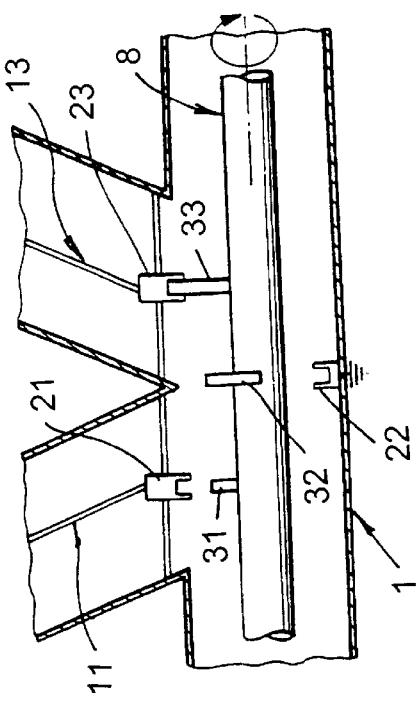
Figure 3C:
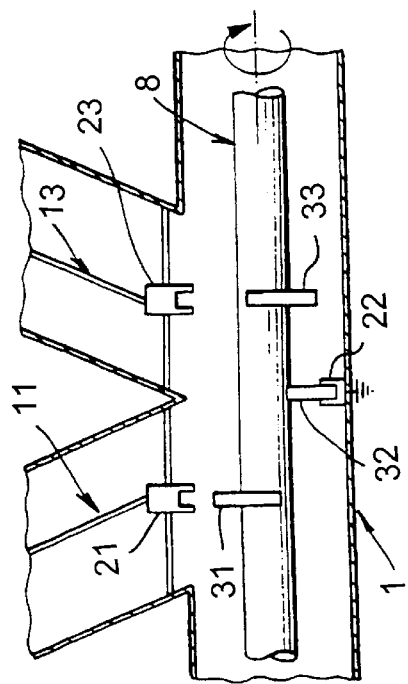
Figure 3D:
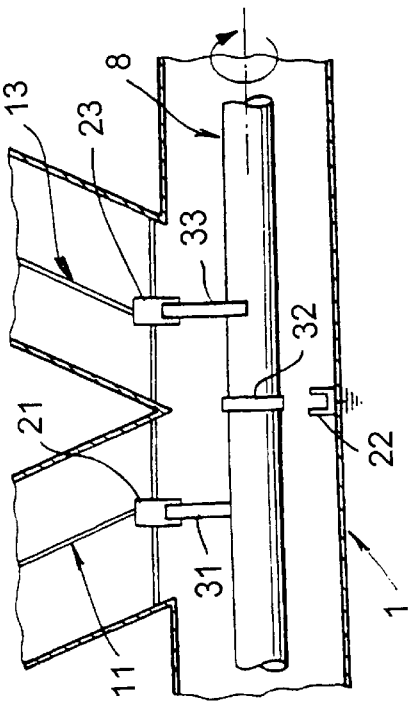

Referring to FIG. 3a, a situation is shown in which the moving contact 32 is coupled to the corresponding fixed contact 22 while the moving contacts 31 and 33 are uncoupled from the corresponding fixed contacts. By turning the shaft 8 in the direction of the arrow, the ground contact is opened and then the moving contract 31 is coupled to the fixed contact 21, closing the connection to the second terminal 11 (FIG. 3b). By further rotating the shaft 8 in the same direction, the moving contact 33 couples to the fixed contact 93 before the contacts 21 and 31 mutually uncouple. In this way the connection to the third terminal 13 is closed, at the same time keeping closed the connection to the terminal 11 (FIG. 3c). If the rotation of the shaft 8 continues, it is possible to separate the contact 31 from the contact 21, opening the connection to the terminal 11 and keeping closed the connection to the terminal 13 (FIG. 3d). According to an alternative embodiment of a gas-insulated switchgear device for a double-bar system, not shown in the Figure, the disconnection unit comprises only two moving contacts fixed to the shaft 8. The fixed ground contact 22 and one of the other two fixed contacts, for example the fixed contact 21, lie on the rotation plane of such moving contact, which can alternatively couple to the fixed contact 21 or to the fixed contact 22; the third fixed contact 23 lies in the rotation plane of the other moving contact and can be coupled thereto. The two moving contacts are fixed to the shaft 8 in such a relative angular position that they cannot be simultaneously coupled to the contacts 22 and 23, while their relative angular position is such that they can be simultaneously coupled to the fixed contacts 21 and 23.

According to a preferred embodiment, the switchgear device according to the present invention comprises an interruption unit having an interruption chamber which accommodates a stationary contact 81 and a mobile contact 82, the longitudinal axis 83 of the interruption chamber being substantially aligned with the rotation axis of the rotating actuation element. In this case, the opening/closure operation of the interruption unit occurs by means of a translatory motion of the moving contact of the interruption unit along the longitudinal axis of the device, while the disconnection operation occurs by rotation of the moving contacts of the disconnection unit about said longitudinal axis.

According to a particular embodiment, the rotating actuation element of the disconnection unit is constituted by the casing of the interruption chamber. In this case the moving contacts of the disconnection unit are keyed to the outer surface of the interruption chamber, which can rotate with respect to the casing of the device. The movement is applied by actuation means, for example an appropriately controlled electric motor. The relative arrangement of the fixed contacts and of the moving contacts is similar to the one shown in FIG. 1 or FIG. 2, depending on whether a single- or double-bar system is present. By using this technical solution, the device according to the present invention is particularly compact, since the space occupied by the disconnection unit is distributed inside the casing 1 along the interruption chamber.

According to a further embodiment of the device according to the present invention, the disconnection unit comprises an additional fixed contact 12 connected to the first terminal and a moving contact 14 which can be coupled to the fixed contact; the moving contact is preferably fixed on the casing of the chamber in such a position that the additional fixed contact lies on its rotation plane. It is thus possible to perform disconnection for example on the input side of the device.

As previously mentioned, the movement of the disconnection elements is performed by appropriate actuation means, preferably constituted by a controlled electric motor. In particular, it has been observed that the use of a servo-motor entails considerable advantages in terms of precision and speed of execution of the operation. As an alternative, it is possible to use mechanical or hydraulic actuation means. Manual actuation means can also be provided as an alternative, or as an addition, to the above described actuation means, particularly for performing emergency manual operations.

The device according to the invention can be of the single-pole actuation type in which there are actuation means on each individual phase in order to perform the disconnection operation; as an alternative, the device can be of the three-pole actuation type, in which the energy for performing the disconnection operation on the three phases of the device is supplied by a single actuation means which is mechanically coupled to the disconnection unit s of each individual phase.

The gas-insulated switchgear device thus conceived is susceptible of numerous modifications and embodiments, all of which are within the scope of the inventive concept; all the details may further be replaced with technically equivalent elements. In practice, the considered embodiments, so long as they are compatible with the specific use, as well as the single components, may be any according to the requirements and the state of the art.

What is claimed is:

1. A gas-insulated switchgear device comprising a casing including a first connection terminal and a second connection terminal and containing an interruption unit and a disconnection unit, wherein said disconnection unit comprises a first fixed contact connected to the second connection terminal, a second fixed contact at ground potential, a third fixed contact which is connected to the first connection terminal, a first moving contact which can be coupled to said third fixed contact, a second moving contact which can be coupled to at least one of said first and second fixed contacts and is electrically connected to said interruption unit, wherein said second moving contact is rigidly fixed to a rotating actuation element and at least one of said first and second fixed contacts lies on a rotation plane of said second moving contact, and wherein said interruption unit comprises an interruption chamber having a rotating case including a stationary contact and a mobile contact, a longitudinal axis of said interruption chamber being aligned with the rotating actuation element, said first moving contact being fixed on said case of the interruption chamber in such a position that said third fixed contact lies in a rotation plane of the first moving contact.

2. The switchgear device according to claim 1, wherein said first and second fixed contacts lie on the rotation plane of said second moving contact.

3. The switchgear device according to claim 1, wherein the disconnection unit comprises a third moving contact which is fixed to said rotating actuation element and wherein said first and second fixed contacts lie on the rotation plane of said second moving contact and said third moving contact respectively, the second and third moving contacts being fixed to said rotating actuation element with such a relative angular position that they cannot be simultaneously coupled to said first fixed contact and to said second fixed contact respectively.

4. The switchgear device according to claim 1, wherein the casing comprises a third connection terminal and the disconnection unit comprises a fourth fixed contact connected to said third connection terminal, and a third moving contact which is fixed to said rotating actuation element, said first and second fixed contacts lying in the rotation plane of said second moving contact, the fourth fixed contact lying in the rotation plane of said third moving contact, the second and third moving contacts being fixed to said rotating actuation element with such a relative angular position that they cannot be simultaneously coupled to said second fixed contact and said fourth fixed contact respectively.

5. The switchgear device according to claim 1, wherein the casing comprises a third connection terminal and the disconnection unit comprises a fourth fixed contact which is connected to said third connection terminal, and a third and a fourth moving contacts which are fixed to said rotating actuation element, the first, the second and the fourth fixed contact lying in the rotation plane of the second, the third and the fourth moving contact respectively, said second, third and fourth moving contacts being fixed to the rotating actuation element with such a relative angular position that the third moving contact cannot be coupled to the second fixed contact when the second moving contact is coupled to the first fixed contact and the fourth moving contact is coupled to the fourth fixed contact.

6. The switchgear device according to claim 1, wherein said second moving contact comprises a blade that is keyed on said rotating actuation element and is perpendicular to the rotation axis of said rotating actuation element.

7. The switchgear device according to claim 1, wherein the rotating actuation element is actuated by an electric motor.

8. The switchgear device according to claim 1, wherein said electric motor is a servo-motor.

* * * * *